(12) United States Patent
Conness et al.

(10) Patent No.: US 10,819,186 B2
(45) Date of Patent: Oct. 27, 2020

(54) HYDROELECTRIC CHARGING ASSEMBLY

(71) Applicants: Edna Rose Conness, Collinsville, IL (US); Garrett Ray Harbison, St. Jacob, IL (US); Tristan Joseph Luehmann, Troy, IL (US); Sophia XiaoTong Windorff, Maryville, IL (US); Samantha Louise Fulton, Worden, IL (US); Lincoln Tyler Duffy, Maryville, IL (US); Reanna Hope-Leigh Compton, Collinsville, IL (US); Juan Manuel Lance Callis, St. Jacob, IL (US); Hannah Christine Harrison, Troy, IL (US)

(72) Inventors: Edna Rose Conness, Collinsville, IL (US); Garrett Ray Harbison, St. Jacob, IL (US); Tristan Joseph Luehmann, Troy, IL (US); Sophia XiaoTong Windorff, Maryville, IL (US); Samantha Louise Fulton, Worden, IL (US); Lincoln Tyler Duffy, Maryville, IL (US); Reanna Hope-Leigh Compton, Collinsville, IL (US); Juan Manuel Lance Callis, St. Jacob, IL (US); Hannah Christine Harrison, Troy, IL (US)

(*) Notice: Subject to any disclaimer, the term of this patent is extended or adjusted under 35 U.S.C. 154(b) by 0 days.

(21) Appl. No.: 16/288,378

(22) Filed: Feb. 28, 2019

(65) Prior Publication Data

US 2019/0273418 A1 Sep. 5, 2019

Related U.S. Application Data (60) Provisional application No. 62/637,091, filed on Mar. 1, 2018.

(51) Int. Cl.
*H02K 7/18* (2006.01)
*H02K 11/04* (2016.01)
(Continued)

(52) U.S. Cl.
CPC .............. *H02K 7/1823* (2013.01); *F03B 1/00* (2013.01); *H02J 7/0013* (2013.01); *H02K 11/0094* (2013.01); *H02K 11/046* (2013.01)

(58) Field of Classification Search
CPC ............. H02K 7/1823; H02K 11/0094; H02K 11/046; H02J 7/0013; F03B 1/00
(Continued)

(56) References Cited

U.S. PATENT DOCUMENTS

| | | | | |
|---|---|---|---|---|
| 716,650 | A | * | 12/1902 | Wheeler et al. ........ F04D 19/00 415/31 |
| 2,276,714 | A | * | 3/1942 | Brown ................... F01D 1/026 415/203 |

(Continued)

OTHER PUBLICATIONS

Enomad, "Estream: A portable water power generator fits into backpack", Kickstarter, https://www.kickstarter.com/projects/hyerinster/estream-a-portable-water-power-generator-fits-into (24 pages).

*Primary Examiner* — Pedro J Cuevas
(74) *Attorney, Agent, or Firm* — Christopher R. Carroll; The Small Patent Law Group LLC (57) ABSTRACT

A charging assembly includes a conduit assembly configured to be fluidly coupled with a pre-existing conduit through which a liquid flows, and a hydroelectric generator coupled with the conduit assembly such that at least part of the liquid flowing through the pre-existing conduit flows through the hydroelectric generator. The hydroelectric generator is configured to create an electric current based on flow of the liquid through the hydroelectric generator. The assembly also includes an energy storage assembly conductively coupled with the hydroelectric generator. The energy (Continued)

storage assembly is configured to store electric energy of the electric current created by the hydroelectric generator.

20 Claims, 8 Drawing Sheets

(51) Int. Cl.
    *F03B 1/00*     (2006.01)
    *H02J 7/00*     (2006.01)
    *H02K 11/00*     (2016.01)

(58) Field of Classification Search
    USPC .................................. 290/43, 50, 52, 54
    See application file for complete search history.

(56) References Cited

U.S. PATENT DOCUMENTS

| | | | | |
|---|---|---|---|---|
| 3,750,001 | A * | 7/1973 | McCloskey | A01G 25/16 322/35 |
| 3,845,291 | A * | 10/1974 | Portyrata | F21S 9/046 362/192 |
| 4,122,381 | A * | 10/1978 | Sturm | H02J 7/34 320/128 |
| 4,246,753 | A * | 1/1981 | Redmond | F03B 13/00 60/398 |
| 4,352,025 | A * | 9/1982 | Troyen | F03B 13/00 290/54 |
| 4,387,575 | A * | 6/1983 | Wenzel | F02C 1/04 60/648 |
| 4,408,127 | A * | 10/1983 | Santos, Sr. | F03B 17/005 290/43 |
| 4,488,055 | A * | 12/1984 | Toyama | F03B 13/08 290/42 |
| 4,496,845 | A * | 1/1985 | Ensign | F03B 15/12 290/43 |
| 4,555,637 | A * | 11/1985 | Irvine | F01D 15/10 290/52 |
| 4,564,889 | A * | 1/1986 | Bolson | F21S 8/00 290/54 |
| 4,731,545 | A * | 3/1988 | Lerner | H02K 7/1823 290/43 |
| 4,740,711 | A * | 4/1988 | Sato | F01B 13/061 290/52 |
| 4,808,837 | A * | 2/1989 | Matthias | F03B 13/00 290/52 |
| 4,963,780 | A * | 10/1990 | Hochstrasser | H02K 7/1823 310/104 |
| 5,043,592 | A * | 8/1991 | Hochstrasser | F03B 13/00 290/52 |
| 5,079,495 | A * | 1/1992 | Yasuo | E03D 5/105 320/101 |
| 5,140,254 | A * | 8/1992 | Katzman | A47K 3/281 290/54 |
| 5,263,814 | A * | 11/1993 | Jang | F01D 1/24 415/63 |
| 6,036,333 | A * | 3/2000 | Spiller | F03B 13/00 290/43 |
| 6,509,652 | B2 * | 1/2003 | Yumita | F03B 13/00 290/54 |
| 6,559,553 | B2 * | 5/2003 | Yumita | F03B 3/00 290/43 |
| 6,765,308 | B1 * | 7/2004 | Kazanjian | F03B 13/00 290/43 |
| 6,768,218 | B2 * | 7/2004 | Yumita | F03B 13/00 290/43 |
| 6,876,100 | B2 * | 4/2005 | Yumita | F03B 13/00 290/43 |
| 7,005,758 | B2 * | 2/2006 | Yumita | F03B 13/00 290/43 |
| 7,253,536 | B2 * | 8/2007 | Fujimoto | E03D 3/00 290/43 |
| 7,357,599 | B2 * | 4/2008 | Cripps | E03F 3/00 290/1 R |
| 7,452,160 | B2 * | 11/2008 | Cripps | E03F 3/00 290/1 R |
| 7,579,703 | B2 * | 8/2009 | Shifrin | F03B 13/105 290/52 |
| 7,632,040 | B2 * | 12/2009 | Cripps | E02B 9/00 290/1 R |
| 7,768,146 | B2 * | 8/2010 | Balzano | F03B 13/00 290/43 |
| 7,802,942 | B2 * | 9/2010 | Cripps | E03F 3/00 290/1 R |
| 7,825,531 | B2 * | 11/2010 | Tanaka | F03B 3/02 290/43 |
| 7,919,877 | B2 * | 4/2011 | Shimizu | E03C 1/0404 290/43 |
| 7,946,789 | B2 * | 5/2011 | Cripps | E02B 9/00 290/1 R |
| 8,002,499 | B2 * | 8/2011 | Cripps | E03F 3/00 290/1 R |
| 8,044,530 | B2 * | 10/2011 | Harris | F03B 1/02 290/43 |
| 8,067,850 | B2 * | 11/2011 | Alvarez | B82Y 15/00 290/54 |
| 8,080,892 | B2 * | 12/2011 | Juneau | F03B 13/06 290/53 |
| 8,092,675 | B2 * | 1/2012 | Kennedy | C02F 1/4674 204/194 |
| 8,147,167 | B2 * | 4/2012 | Cripps | E02B 9/00 290/1 R |
| 8,147,168 | B2 * | 4/2012 | Cripps | E03F 3/00 290/1 R |
| 8,228,031 | B2 * | 7/2012 | Alameh | H02J 7/32 320/115 |
| 8,294,292 | B2 * | 10/2012 | Irwin | F03B 3/02 290/43 |
| 8,376,656 | B2 * | 2/2013 | Cripps | E02B 9/00 290/1 R |
| 8,550,746 | B2 * | 10/2013 | Cripps | E03F 3/00 290/1 R |
| 8,585,320 | B2 * | 11/2013 | Cripps | E02B 9/00 290/1 R |
| 8,794,873 | B2 * | 8/2014 | Cripps | E03F 3/00 210/162 |
| 8,946,921 | B2 * | 2/2015 | Kaiser | H02K 7/1823 290/43 |
| 9,157,411 | B2 * | 10/2015 | Cripps | E03F 3/00 |
| 9,523,344 | B2 * | 12/2016 | Farb | F03B 13/00 |
| 9,587,508 | B2 * | 3/2017 | Park | F03B 15/08 |
| 9,593,664 | B2 * | 3/2017 | Cripps | E03F 3/00 |
| 9,863,396 | B2 * | 1/2018 | Oncale | F03B 3/04 |
| 9,869,292 | B2 * | 1/2018 | Kang | F03B 15/16 |
| 10,443,561 | B1 * | 10/2019 | Yang | H02K 5/1732 |
| 2002/0041100 | A1 * | 4/2002 | Yumita | F03B 3/00 290/52 |
| 2002/0047374 | A1 * | 4/2002 | Yumita | F03B 13/00 310/81 |
| 2002/0113442 | A1 * | 8/2002 | Yumita | F03B 13/00 290/54 |
| 2008/0143109 | A1 * | 6/2008 | Pitchford | G01D 4/004 290/43 |
| 2008/0217923 | A1 * | 9/2008 | Yen | F03B 13/00 290/54 |
| 2009/0160193 | A1 * | 6/2009 | Farb | F03B 13/00 290/54 |
| 2009/0289458 | A1 * | 11/2009 | Juneau | F03B 13/06 290/54 |
| 2010/0045233 | A1 * | 2/2010 | Alameh | H02J 7/32 320/114 |
| 2014/0327247 | A1 * | 11/2014 | Calabro | F03D 9/008 290/4 C |
| 2017/0292500 | A1 * | 10/2017 | Calabro | F03D 9/007 |

* cited by examiner

FIG. 11

HYDROELECTRIC CHARGING ASSEMBLY

CROSS-REFERENCE TO RELATED APPLICATIONS

This application claims priority to U.S. Patent Application No. 62/637,091, which was filed on 1 Mar. 2018, and the entire disclosure of which is incorporated herein by reference.

FIELD

Embodiments of the subject matter disclosed herein relate to charging energy storage devices, such as batteries, using moving liquids.

BACKGROUND

Electric current is useful in most all facets of daily life in developed countries. For example, mobile telephones, tablet computers, televisions, and the like, are widely used and all require regular charging of batteries that power these devices. Most users of these devices are able to charge the devices by plugging the devices into a utility grid (e.g., via an outlet inside a residential or commercial building), but this comes at a cost to obtain the electric current from a utility company providing the current. Some users may not have access to a utility grid, such as those users who are camping or otherwise away from an outlet, users who live in an area experiencing a utility outage due to an accident or natural disaster, and the like. Some users simply may not want to use the current provided by a utility due to environmental concerns.

But, while these users may not be able to or may not want to obtain current to charge the devices from a utility grid, other sources of current to power the devices may not be readily available. Solar panels or cells may not work for users that are not in locations having sufficient solar energy to generate current. Additionally, solar panels and cells may need to be relatively large to generate enough current to charge the devices. Otherwise, smaller panels can require a significantly long period of time before the panels generate enough current to charge the devices.

Some assemblies are available to charge electronic devices while users are away from or otherwise do not have access to a utility grid. For example, a portable water-power generator can be inserted into moving water, such as that from a river or stream, to convert the kinetic energy of the moving water into stored energy to charge electronic devices. But, these types of generator assemblies can require users to hold the generator in the flowing water, which can be cumbersome, can interfere with other activities, and may not be practical in certain cold water or weather conditions.

BRIEF DESCRIPTION

In one embodiment, a charging assembly includes a conduit assembly configured to be fluidly coupled with a pre-existing conduit through which a liquid flows, and a hydroelectric generator coupled with the conduit assembly such that at least part of the liquid flowing through the pre-existing conduit flows through the hydroelectric generator. The hydroelectric generator is configured to create an electric current based on flow of the liquid through the hydroelectric generator. The assembly also includes an energy storage assembly conductively coupled with the hydroelectric generator. The energy storage assembly is configured to store electric energy of the electric current created by the hydroelectric generator.

In one embodiment, a charging assembly includes a hand-held conduit assembly configured to direct flow of a fluid, and a hand-held hydroelectric generator coupled with the conduit assembly such that at least part of the liquid flowing through the conduit assembly flows through the hydroelectric generator. The hydroelectric generator is configured to create an electric current based on flow of the liquid through the hydroelectric generator. The assembly also includes a hand-held energy storage assembly conductively coupled with the hydroelectric generator. The energy storage assembly is configured to store electric energy of the electric current created by the hydroelectric generator.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

One or more embodiments described herein provide waterspark charging assemblies and associated methods for converting the kinetic energy of moving liquids (e.g., water) into electric potential and optionally storing the electric potential for powering electronic devices. The charging assemblies described herein can be passive devices in that continued or repeated user interaction with the assemblies is not required for the assemblies to operate. The charging assemblies can be portable and removable to ease of use in a variety of situations. For example, one embodiment of the charging assemblies can be placed on the end of a conduit, such as a downspout of a gutter system on a home, to convert flowing rainwater into electric current. Optionally, the charging assembly may be fixed in place, such as by inserting or otherwise fixing the charging assembly in place in the gutter system (so that the charging assembly cannot be removed without disassembling the gutter system).

Not all embodiments of the charging assemblies are limited to gutter systems, however. The charging assemblies can be coupled with drain lines of sinks, tubs, or the like, or can be coupled with water (or other liquid) lines that supply water or other liquid into a home or other building. Whether removable or fixed in position, the charging assemblies can remain stationary without any operator intervention while liquid flows through the charging assemblies to convert the kinetic energy of the moving liquid into electric potential. For example, instead of being held in place by a user or pulled behind a moving object (e.g., a boat or other floating structure), the charging assemblies can be coupled with a conduit (e.g., man-made conduit) through which a liquid flows in order to convert the movement of the liquid into electric current.

Figure 1:
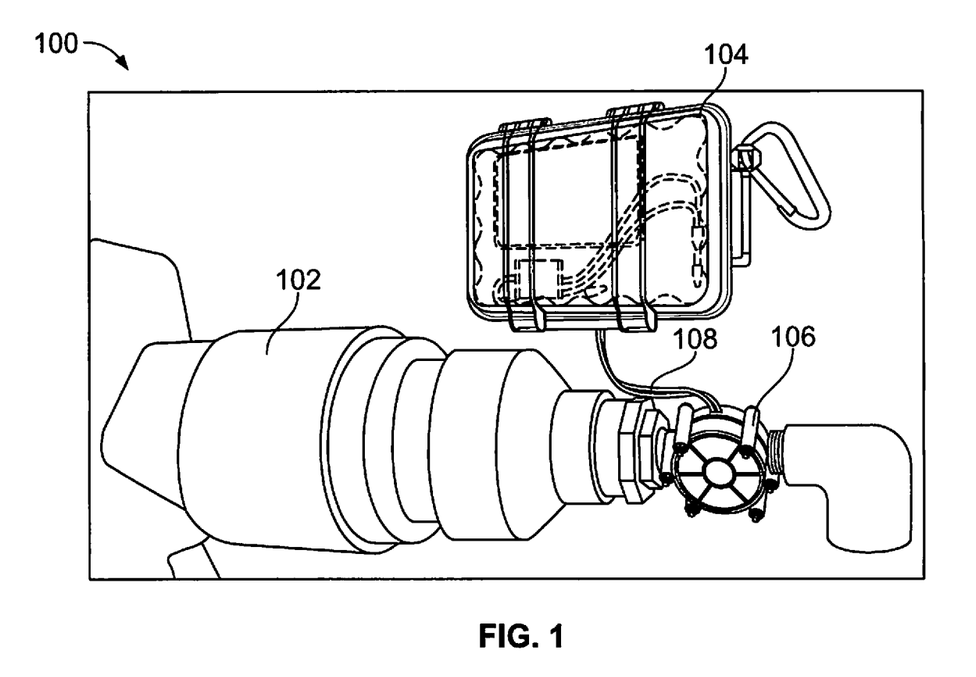
FIG. 1 illustrates one embodiment of a waterspark charging assembly.

FIG. 1 illustrates one embodiment of a waterspark charging assembly 100. The charging assembly 100 includes a conduit assembly 102 that is fluidly coupled with a pre-existing conduit through which a liquid flows. The conduit assembly 102 can be formed from pipes or other structures that direct the liquid into and through a hydroelectric generator 106 of the charging assembly 100. The hydroelectric generator 106 includes a generator having a rotor (not visible in FIG. 1) that is rotated inside a stator (not visible in FIG. 1) by movement of the liquid through the hydroelectric generator 106. This movement results in electric current being generated and output by the hydroelectric generator 106.

The charging assembly 100 includes an energy storage assembly 104 having one or more components (described herein) that are conductively coupled with the hydroelectric generator 106. The energy storage assembly 104 can store the electric energy of the electric current created by the hydroelectric generator 106. For example, the energy storage assembly 104 can collect and store electric energy for later use in charging or otherwise powering one or more other electronic devices.

In the illustrated embodiment, the charging assembly 100 is a hand-held or otherwise portable assembly. For example, the conduit assembly 102, hydroelectric generator 106, and the energy storage assembly 104 are hand-held components that can be moved from location to location (e.g., between different pre-existing conduits) by a user. This can allow a user to attach the conduit assembly 102 to a source or other location of a moving liquid, such as the downspout of a building, when the user wishes to charge one or more energy storage devices in the energy storage assembly 104 with energy from the hydroelectric generator 106. The user can then remove the charging assembly 100 from the source of moving liquid when the user no longer wishes to charge the one or more energy storage devices in the energy storage assembly 104.

Alternatively, the charging assembly 100 may be fixed in position. For example, the conduit assembly 102 may be attached to a pre-existing conduit, such as a gutter or downspout on a building, and left in place. This can result in the charging assembly 100 been a permanent fixture or part of another structure (for example, part of the downspout of a home), where the charging assembly 100 remains in place and is not removable without disassembly of the pre-existing conduit and/or the charging assembly 100.

Figure 2:
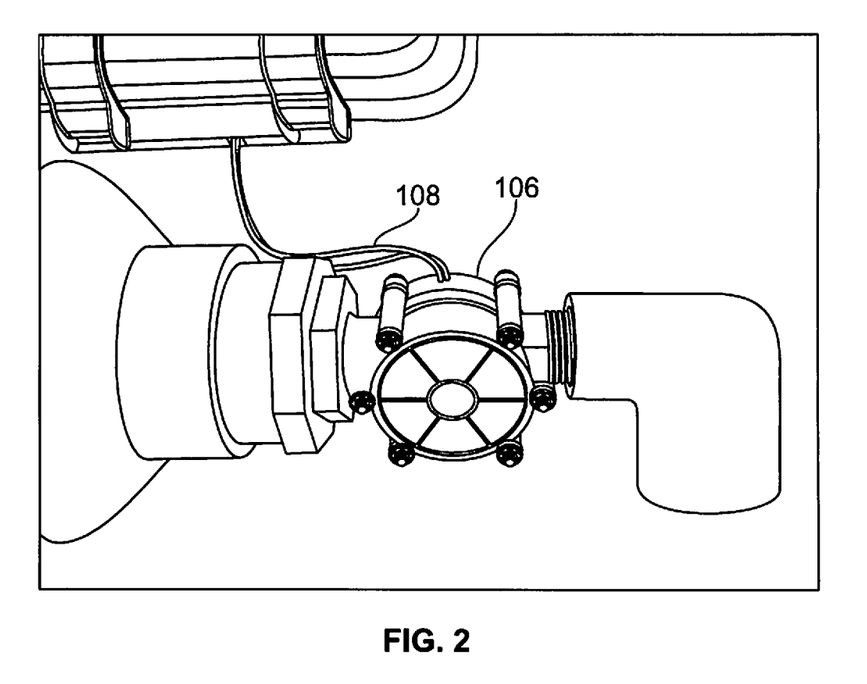
FIG. 2 illustrates a hydroelectric generator shown in FIG. 1 according to one embodiment.

FIG. 2 illustrates the hydroelectric generator 106 according to one embodiment. The hydroelectric generator 106 is coupled with the conduit assembly 102 such that liquid moving through the conduit assembly 102 is directed or funneled into the hydroelectric generator 106, and flows through the hydroelectric generator 106. The liquid flowing through the hydroelectric generator 106 may then exit from the charging assembly 100 via an opposite end or other end of the conduit assembly 102. The conduit assembly 102 can be formed from rigid and/or flexible pipes or other conduits to direct and/or funnel moving liquid toward, through, and away from the hydroelectric generator 106.

The movement of liquid through the hydroelectric generator 106 moves a rotor inside or outside of a stator in the hydroelectric generator 106, which creates electric current. The hydroelectric generator 106 is conductively coupled with one or more conductive pathways 108. The conductive pathways 108 can represent wires, buses, cables, or the like. In the illustrated embodiment, the conductive pathways 108 represent wires that conductively couple the hydroelectric generator 106 with one or more energy storage devices in the charging assembly 104.

Figure 3:
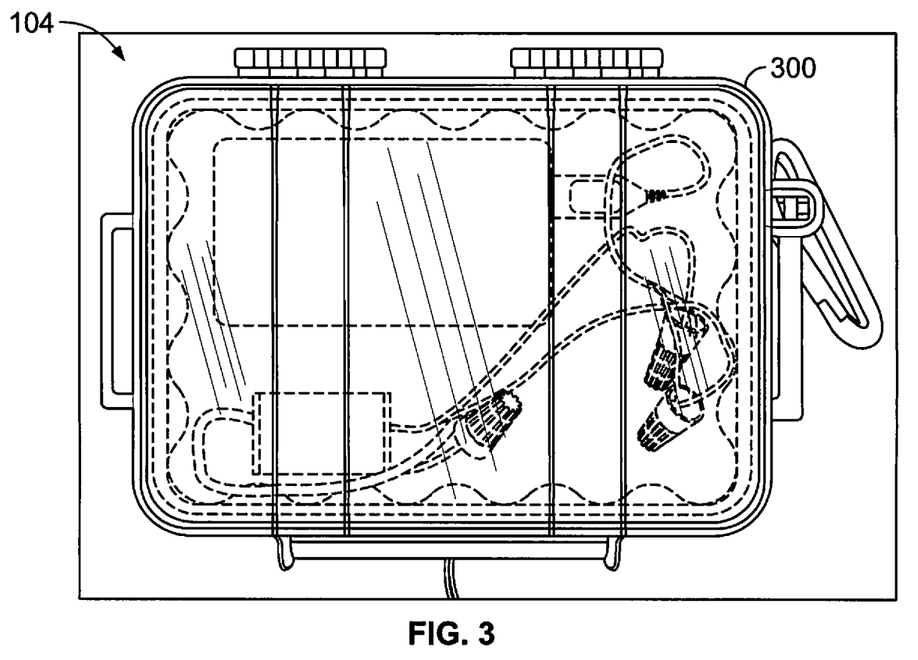
FIG. 3 illustrates a charging assembly shown in FIG. 1 according to one embodiment.

FIG. 3 illustrates the charging assembly 104 according to one embodiment. In the illustrated embodiment, the charging assembly 104 includes an outer housing 300 that encloses and protects internal components of the charging assembly 104. One or more of the conductive pathways 108 may extend through openings or passageways into the housing 300 of the charging assembly 104. This allows for the conductive pathways 108 that are conductively coupled with the hydroelectric generator 106 to extend through the outer housing 300 of the charging assembly 104, and be conductively coupled with electronic components of the charging assembly 104. In one embodiment, the outer housing 300 of the charging assembly 104 is a waterproof or water-resistant housing 300. For example, the housing 300 may prevent moisture, dust, or the like from entering into the interior of the housing 300. This can allow for the electronic components inside the charging assembly 104 to be used in outside environments.

Figure 4:
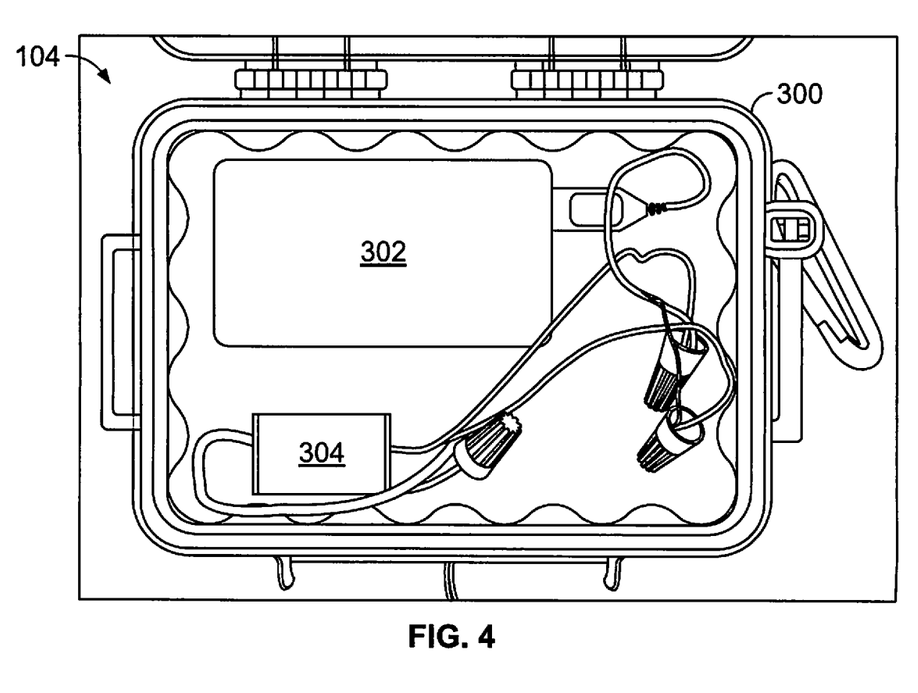
FIG. 4 illustrates the charging assembly shown in FIG. 1 with an outer housing shown in FIG. 3 being open according to one embodiment.

FIG. 4 illustrates the charging assembly 104 with the outer housing 300 open according to one embodiment. As shown, the charging assembly 104 includes one or more energy storage devices 302 that are conductively coupled with the hydroelectric generator 106 by the conductive pathways 108. The energy storage device 302 can include one or more batteries, such as one or more rechargeable batteries. Alternatively, the energy storage device 302 can represent one or more other electronic devices that are capable of storing electric energy, such as one or more capacitors, flywheels, or the like.

There may be one or more current-modifying devices disposed between the energy storage device 302 and the hydroelectric generator 106. For example, a voltage regulator 304 can be conductively coupled with the hydroelectric generator 106 and with the energy storage device 302 in a location that is between the energy storage device 302 and the hydroelectric generator 106. The voltage regulator 304 may be conductively coupled with the energy storage device 302 by one or more additional conductive pathways 108, as shown in FIG. 4.

In operation, current is output by the hydroelectric generator 106 is conducted to the energy storage device 302 via the conductive pathways 108 and the voltage regulator 304 to charge the energy storage device 302 with electric energy. Voltage that is output from the hydroelectric generator 106 is conducted by the conductive pathways 108 to the voltage regulator 304 inside the housing 300 of the charging assembly 104. The voltage regulator 304 can limit sudden changes (e.g., increases or decreases) in the amount of voltage that is output by the hydroelectric generator 106. These changes can occur when the rate of liquid flow through the hydroelectric generator 106 is inconsistent.

Electric energy is stored in the energy storage device 302 so that the energy storage device 302 can be used to power or charge one or more other electronic devices. For example, a cellular phone, computer, tablet computer, laptop, or the like, can be plugged into the energy storage device 302 and be charged using energy stored in the energy storage device 302. Alternatively, the charge assembly 100 may be used to charge one or more other types of energy storage devices 302. For example, the conductive pathways 108 may connect the hydroelectric generator 106 with one or more other devices inside a building or other structure, such as batteries located inside the building, an outlet or other wiring of the structure, or another device. This can allow for the charging assembly 100 to be fixed in position on the building (for example, permanently coupled with a downspout of the building) so that, whenever water flows down the downspout and through the hydroelectric generator 106, one or more energy storage devices 302 in the building, or one or more electronic devices that are wired with the hydroelectric generator 106, can be powered by the voltage that is output by the hydroelectric generator 106.

Figure 5:
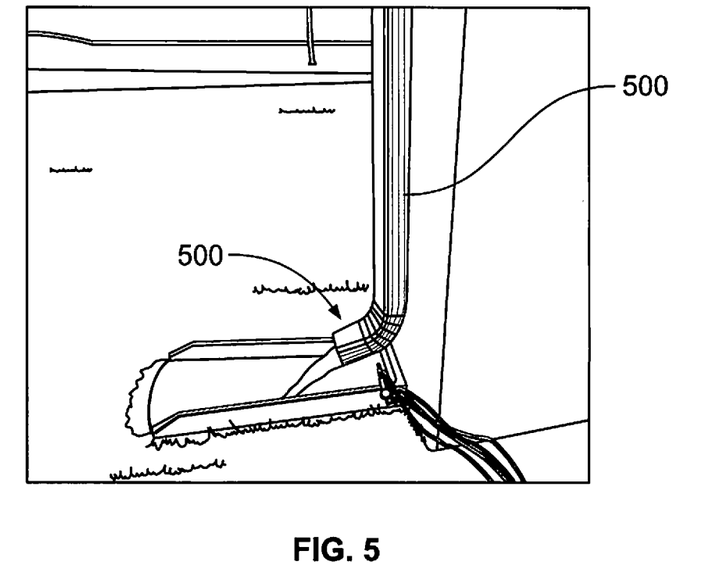
FIG. 5 illustrates one example of a pre-existing conduit to which the charging assembly shown in FIG. 1 may be coupled.

FIG. 5 illustrates one example of a pre-existing conduit 502 to which the charging assembly 100 may be coupled. In the illustrated embodiment, the pre-existing conduit 500 is a downspout of a residential or commercial building. The pre-existing conduit 500 may be fastened to an exterior wall or surface of the structure, and can extend to an outer end 502. Water or other fluids can be directed via gutters or other conduits through the pre-existing conduit 500 and out of the outer end 502 of the conduit 500. This helps direct water away from the foundation of the residential or commercial building.

The charging assembly 100 can be fluidly coupled with the pre-existing conduit 500 so that liquid flowing through the pre-existing conduit 500 is directed into the conduit assembly 102 and through the hydroelectric generator 106 to charge the one or more energy storage devices 302. As one example, the conduit assembly 102 can be coupled with the outer end 502 of the downspout 500. The conduit assembly 102 can be temporarily connected with the outer end 502 of the pre-existing conduit 500, such as by a user inserting the outer end 502 of the pre-existing conduit 500 into the conduit assembly 102 of the charging assembly 100 (or by the user inserting an open end of the conduit assembly 102 into the outer end 502 of the pre-existing conduit 500). This results in the pre-existing conduit 500 and the hydroelectric generator 106 being fluidly coupled with each other. Rain water flowing down the pre-existing conduit 500 is directed into the conduit assembly 102 of the charging assembly 100, and through the hydroelectric generator 106 to generate electric current.

Alternatively, the conduit assembly 102 of the charging assembly 100 can be permanently or more permanently coupled with the pre-existing conduit 500. For example, the conduit assembly 102 can be glued, fastened, bolted, or the like, to the pre-existing conduit 500 at or on the outer end 502. This results in the charging assembly 100 being a permanent or more permanent fixture that cannot be removed from the pre-existing conduit 500 without damaging the conduit 500 and/or the conduit assembly 102.

Figure 6:
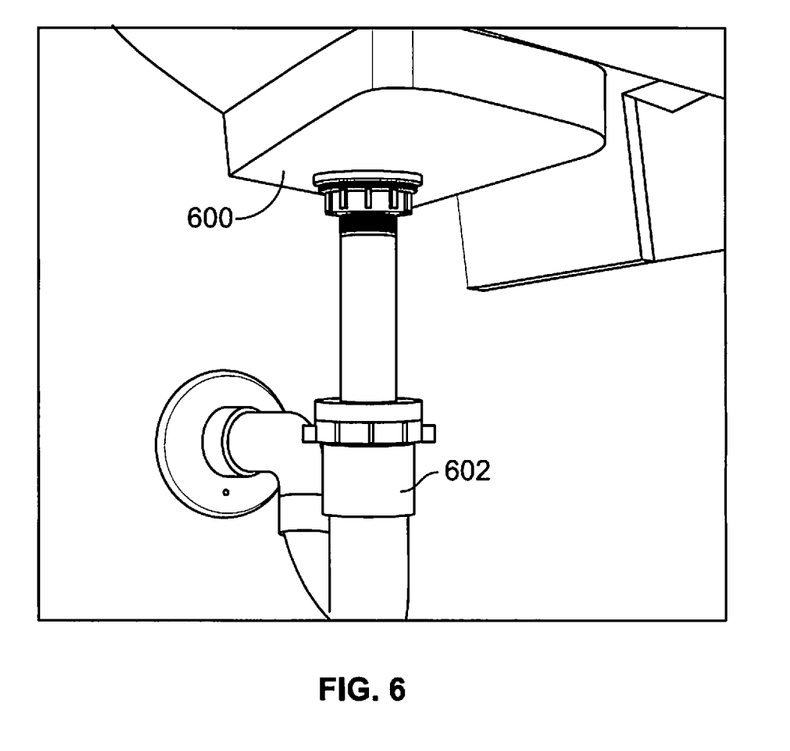
FIG. 6 illustrates another embodiment of a pre-existing conduit to which the charging assembly shown in FIG. 1 can be fluidly coupled.

FIG. 6 illustrates another embodiment of a pre-existing conduit 602 to which the charging assembly 100 can be fluidly coupled. In the illustrated embodiment, the pre-existing conduit 602 is a drain line or drainpipe of a receptacle 600, such as a sink. The shape, size, or the like, of the conduit assembly 102 of the charging assembly 100 can be adapted to meet or mate with the pre-existing conduit 602. For example, the conduit assembly 102 can be connected with and disposed between the drain of the receptacle 600 and at least part of the pre-existing conduit 602 such that water in the receptacle 600 flows through the drain, through the conduit assembly 102, through the hydroelectric generator 106, out of the hydroelectric generator 106, and into a remainder of the pre-existing conduit 602. This can allow for water in a sink, such as a bathroom sink, kitchen sink, shop sink, or the like, to drain out of the receptacle 600, through the charging assembly 100, and drain out via the pre-existing conduit 602, while the hydroelectric generator 106 creates electric current from the flow of the water. Because the sinks or other receptacles 600 may be used on a regular or daily basis, coupling the charging assembly 100 with drain lines of these receptacles 600 can allow for the charging assembly 100 to regularly or repeatedly generate electric current due to the daily or repeated use of the receptacles 600 for other purposes (e.g., to wash hands, tools, plates, etc.).

While the preceding description focuses on the charging assembly 100 being fluidly coupled with a conduit through which a fluid is exiting from a location, such as a downspout directing water away from a structure, a drain line directing water away from a receptacle such as a sink, other embodiments of the charging assembly 100 can position the charging assembly 100 in line with a fluid supply line.

Figure 7:
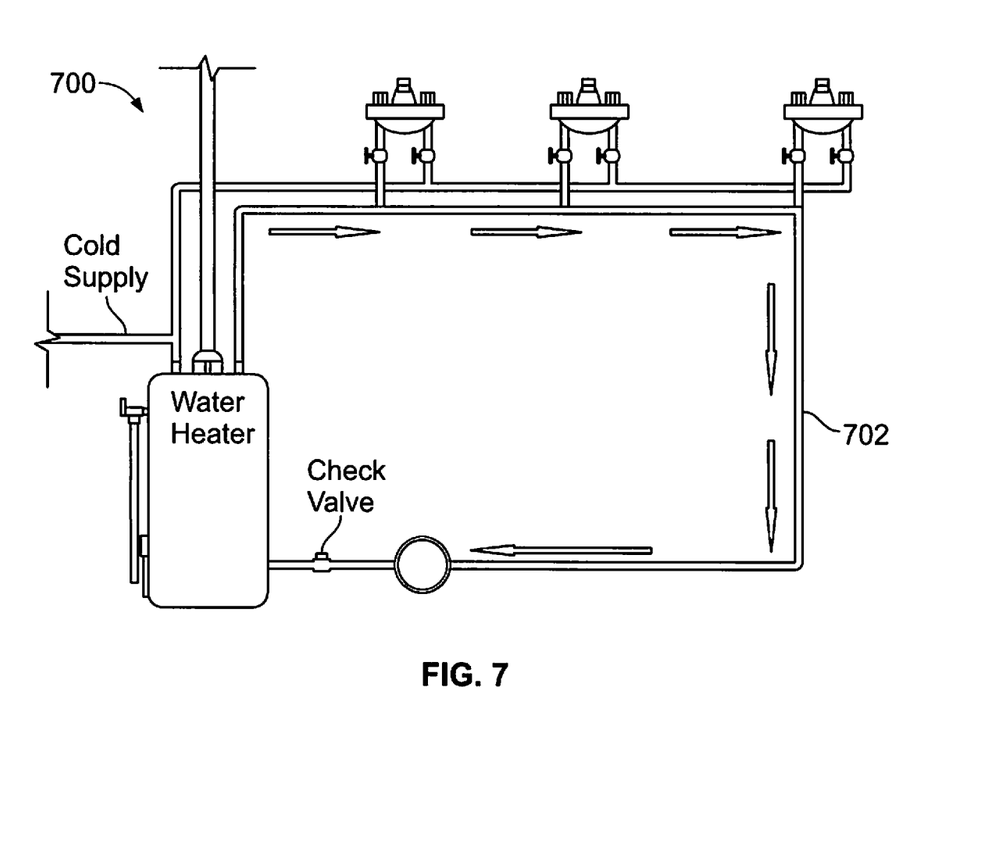
FIG. 7 illustrates a plumbing system according to one example.

FIG. 7 illustrates a plumbing system 700 according to one example. The plumbing system 700 shown in FIG. 7 can represent plumbing in a structure such as a home or commercial building. The plumbing system 700 includes several supply lines, which are conduits that direct a liquid, such as water, to different places in the building. For example, the plumbing system 700 may include pre-existing conduits 702 that direct water to faucets, icemakers, showerheads, toilets, hose connectors, or the like. The plumbing system 700 also can include drain lines, such as the pre-existing conduit 602 described above.

Instead of or in addition to the conduit assembly 102 of the charging assembly 100 being fluidly coupled with a conduit that drains water or liquids away from a source, the conduit assembly 102 of the charging assembly 100 may be fluidly coupled with the pre-existing conduit 702 that supplies or delivers fluid to another location. For example, several water supply lines 702 of the plumbing system 700 may carry water from outside the structure, such as a utility source of water, into the home. Other pre-existing conduits 702 of the plumbing system 700 can direct water from another source, such as a water heater, to one or more locations and structure. The conduit assembly 102 of the charging assembly 100 can be fluidly coupled with one or more of these supply lines 702 such that the flow of fluid through the supply lines 702 for other purposes also causes the hydroelectric generator 106 to create electric current.

For example, the water supply line that carries water from the plumbing system 700 to a faucet of a sink and a home, can be fluidly coupled with the conduit assembly 102. The conduit assembly 102 may be fluidly coupled with the water supply line 702 in a cabinet beneath the sink, and a cabinet above or behind a shower, or the like. Water that is supplied to the faucet, toilet, shower head, or the like, can first pass through the conduit assembly 102 of the charging assembly 100, flow through the hydroelectric generator 106 to cause a hydroelectric generator 106 to create current, out of the conduit assembly 102 of the charging assembly 100, and back into the supply line 702 to the sink, shower head, toilet, or the like. This can allow for the hydroelectric generator 106 to generate current that charges the energy storage device 302 when water is supplied to the faucet, showerhead, toilet, or the like.

Figure 8:
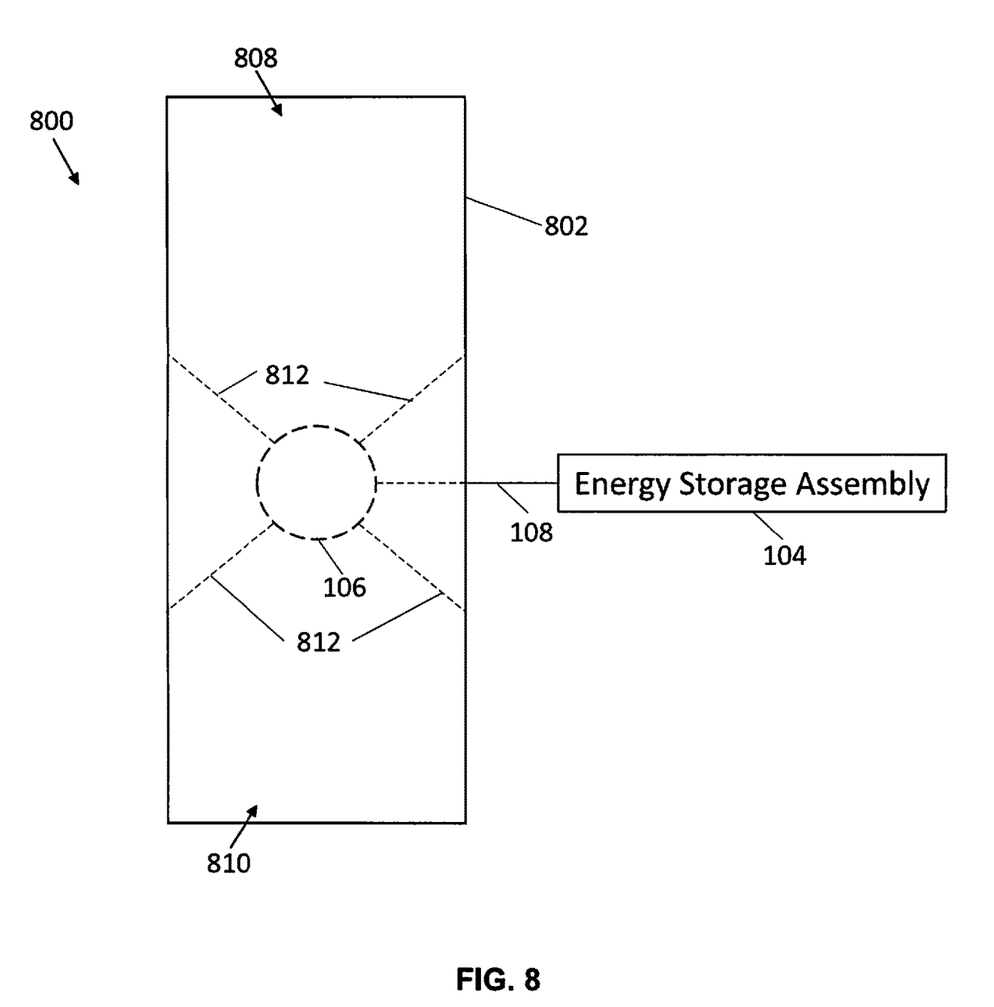
FIG. 8 schematically illustrates another embodiment of a charging assembly.

FIG. 8 schematically illustrates another embodiment of a charging assembly 800. The charging assembly 800 can be similar to the charging assembly 100 in that the charging assembly 800 includes a conduit assembly 802, the hydroelectric generator 106 the conductive pathways 108, an energy storage device assembly 104. One difference between the charging assembly 100 and the charging assembly 800, is that the hydroelectric generator 106 may be disposed inside the conduit assembly 802. For example, instead of having one part of the conduit assembly 102 be fluidly coupled with one end or side of the hydroelectric generator 106 and a remainder or other portion of the conduit assembly 102 connected with an opposite or other end of the hydroelectric generator 106 (as shown in FIG. 1), the charging assembly 800 can include at least the hydroelectric generator 106 inside the conduit assembly 802.

The conduit assembly 802 extends between opposite open ends 808, 810. Moving fluid, such as water draining through a gutter system, water draining from a sink, or the like, can enter into the conduit assembly 802 through the opening 808 or the opening 810. This fluid may flow inside the conduit 802 and through the hydroelectric generator 106 to create current that charges the energy storage device 302 inside the energy storage assembly 104, as described above. Optionally, the conduit assembly 802 may be a liquid supply line, such as a water supply line to a sink, showerhead, toilet, or the like.

The charging assembly 800 optionally may include one or more funnels 812. These funnels 812 may be formed by interior walls inside the conduit assembly 802 that direct the flow of liquid in the conduit assembly 802 toward and into the hydroelectric generator 106. For example, a funnel 812 above the hydroelectric generator 106 can direct water flowing into the conduit assembly 802 down into the hydroelectric generator 106. This can reduce or prevent the liquid from flowing outside of and around the hydroelectric generator 106.

Placing the hydroelectric generator 106 inside the conduit assembly 802 can provide for more aesthetically pleasing charging assembly 100. For example, the outer surfaces of the conduit assembly 802 can be designed to look like a downspout on the outside of a building, with the hydroelectric generator 106 in the conduit assembly 802 and the energy storage assembly 104 disposed behind the conduit assembly 802 or otherwise hidden from view. The hydroelectric generator 106 being located inside the conduit assembly 802 can allow for the building to appear to have several downspouts that have the hydroelectric generator or generators 106 hidden inside the downspouts.

Figure 9:
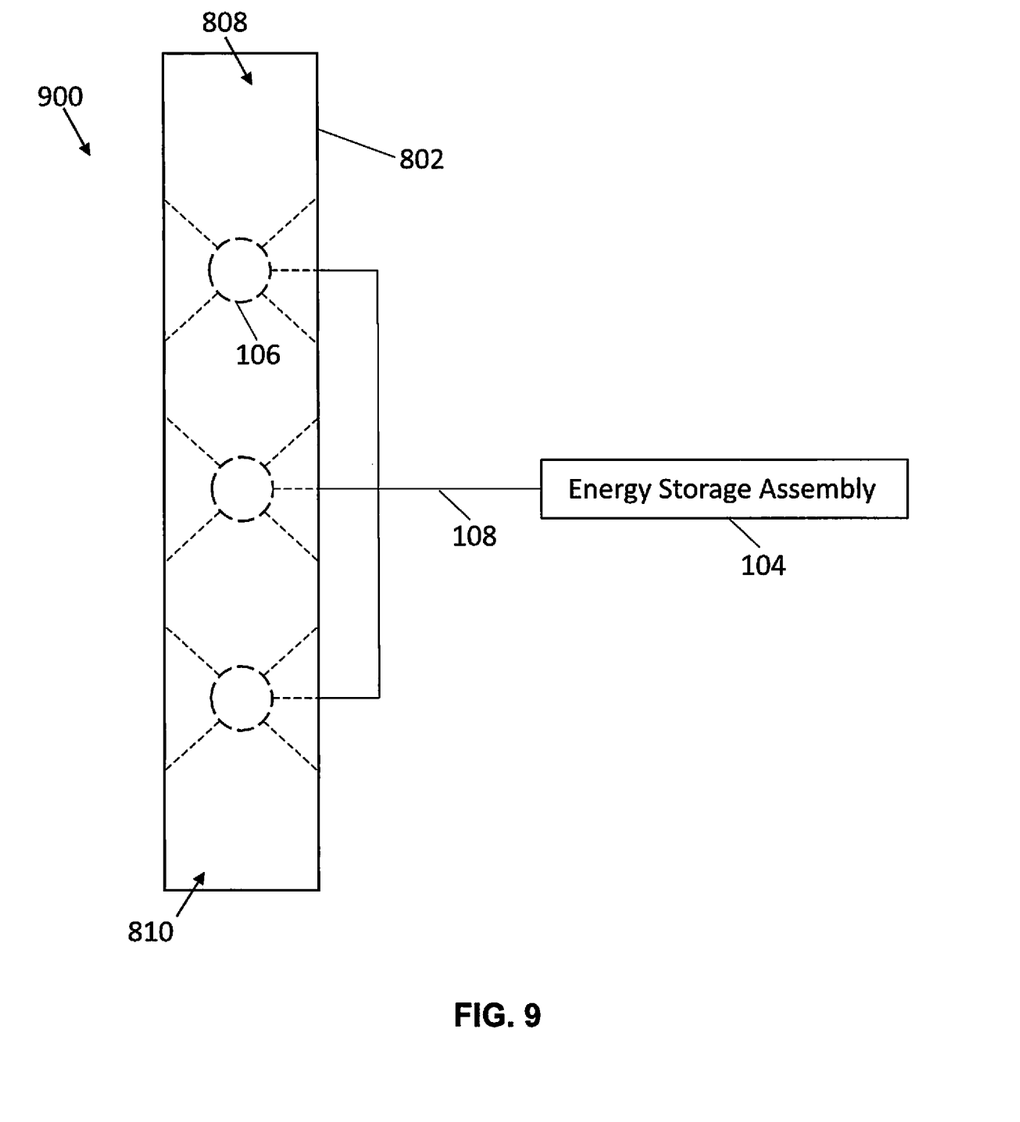
FIG. 9 schematically illustrates another embodiment of a charging assembly.

FIG. 9 schematically illustrates another embodiment of a charging assembly 900. The charging assembly 900 may be similar to the charging assembly 800 shown in FIG. 8. For example, the charging assembly 900 can include the conduit assembly 802 with one or more hydroelectric generators 106 disposed inside the conduit assembly 802. One difference between the charging assembly 800 shown in FIG. 8 and the charging assembly 900 shown in FIG. 9 is the inclusion of several hydroelectric generators 106 inside the conduit assembly 802.

Several hydroelectric generators 106 may be disposed in fluid series with each other inside the conduit assembly 802. The hydroelectric generators 106 are in fluid series with each other in that liquid flowing through the conduit assembly 802 may be funneled or directed into a first hydroelectric generator 106, flow through and out of the first hydroelectric generator 106, continue flowing through the conduit assembly 802 into a second or subsequent hydroelectric generator 106, flow into and through the second hydroelectric generator 106, and continue flowing through the conduit assembly 802 into and/or through one or more additional hydroelectric generators 106. The number of hydroelectric generators 106 in the illustrated conduit assembly 802 is three, however, as few as two hydroelectric generators 106 may be used, or more than three hydroelectric generators 106 may be used.

The hydroelectric generators 106 may be conductively coupled with the same energy storage assembly 104, or with multiple energy storage assemblies 104. In the illustrated embodiment, all hydroelectric generators 106 in the charging assembly 900 are conductively coupled with the same energy storage assembly 104 by several conductive pathways 108. For example, the hydroelectric generators 106 may be conductively coupled with the same energy storage device 302 in the energy storage assembly 104, or may be conductively coupled with several different energy storage devices 302 in different energy storage assemblies 104.

The charging assuming 900 can generate increased amounts of voltage and/or current relative to the charging assemblies 100, 800. For example, the inventors of the inventive subject matter described herein have discovered that a 12 volt direct current (DC) hydroelectric generator with a half-inch thread used as the generator 106 can generate at least approximately 7.5 volts DC. Combining several generators 106 in series can additively increase this output such that two generators 106 in series can potentially generate twice this current, three generators 106 in series can potentially triple this current output, and so on.

Figure 10:
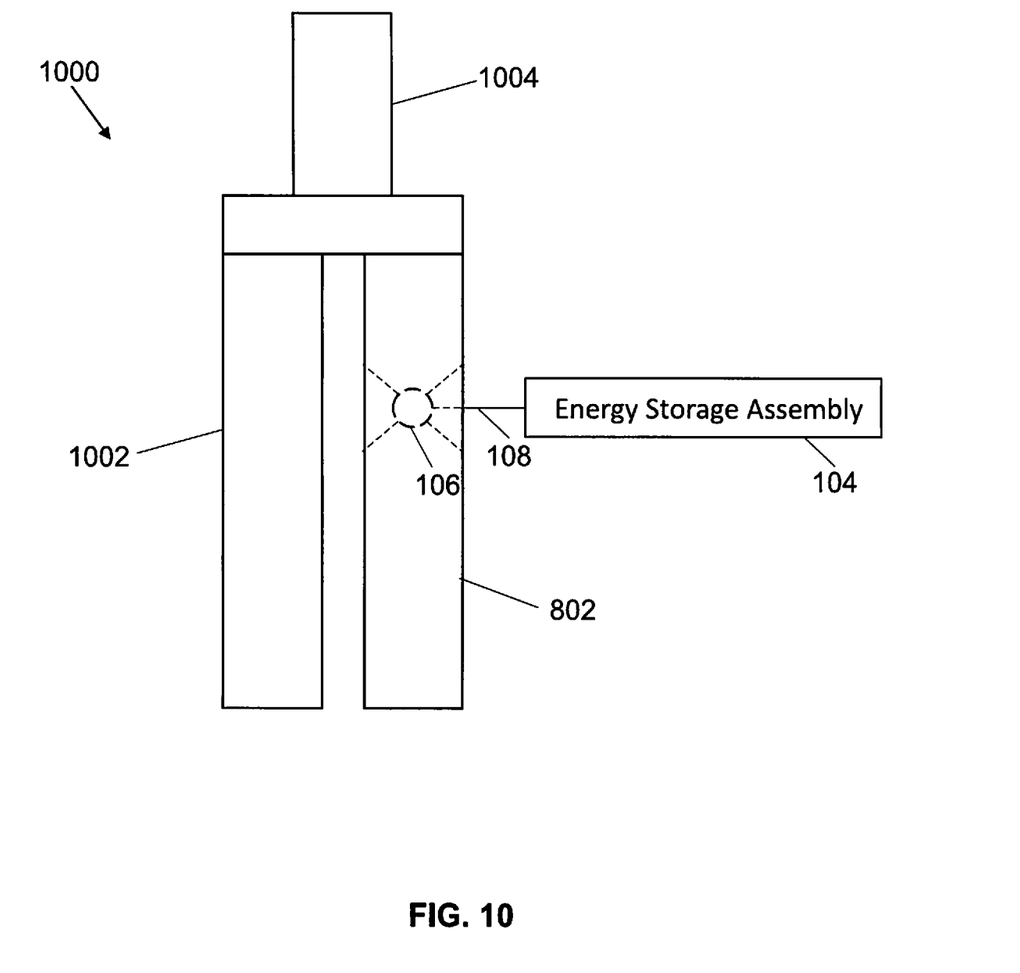
FIG. 10 schematically illustrates another embodiment of the charging assembly.

FIG. 10 schematically illustrates another embodiment of the charging assembly 1000. The charging assembly 1000 is similar to the charging assemblies 100, 800, 900, in that the charging assembly 1000 includes one or more hydroelectric generators 106 that are fluidly coupled with a conduit assembly 802, and one or more energy storage assemblies 104 that are conductively coupled with the hydroelectric generator 106 by the conductive pathways 108. While only a single hydroelectric generator 106 is shown in the conduit assembly 802 in the illustrated embodiment, alternatively, multiple hydroelectric generators 106 may be disposed inside the conduit assembly 802, as described above.

One difference between the charging assembly 1000 and the charging assemblies 100, 800, 900, is that the charging assembly 1000 includes a bypass conduit 1002. The bypass conduit 1002 provides a path through which part of the liquid flowing in the charging assembly 1000 can flow while another part of this liquid flows through the conduit 802 and the hydroelectric generator 106, to create electric current, as described above. The bypass conduit 1002 and the conduit assembly 802 are arranged parallel to each other such that liquid flowing in a first portion conduit 1004 is divided into flowing in either the bypass conduit 1002 or the conduit assembly 802.

For example, the conduit portion 1004 can represent a downspout of a building, a drain line, or a water supply line, or the like. Liquid flowing down through the conduit portion 1004 may partially flow into the bypass conduit 1002 and partially flow into the conduit assembly 802. The portion of liquid flowing into the conduit assembly 802 flows through the hydroelectric generator 106 to create electric current, as described herein. The portion of the liquid flowing in the bypass conduit 1002 does not flow through the hydroelectric generator 106 and therefore does not generate electric current.

The use of the bypass conduit 1002 can help prevent liquid backup above or upstream of the hydroelectric generator 106. For example, because liquid flowing through the hydroelectric generator 106 rotates a rotor of the hydroelectric generator 106, and/or because the pathway through which the liquid flows in the hydroelectric generator 106 may be more constricted or limited relative to other parts of the conduit assembly 802, it may require longer for liquid to flow through the hydroelectric generator 106 than other parts of the conduit assembly 802 and/or the bypass conduit 1002. The liquid may pool or otherwise collect upstream of the hydroelectric generator 106 as the liquid flows through the hydroelectric generator 106.

Figure 11:
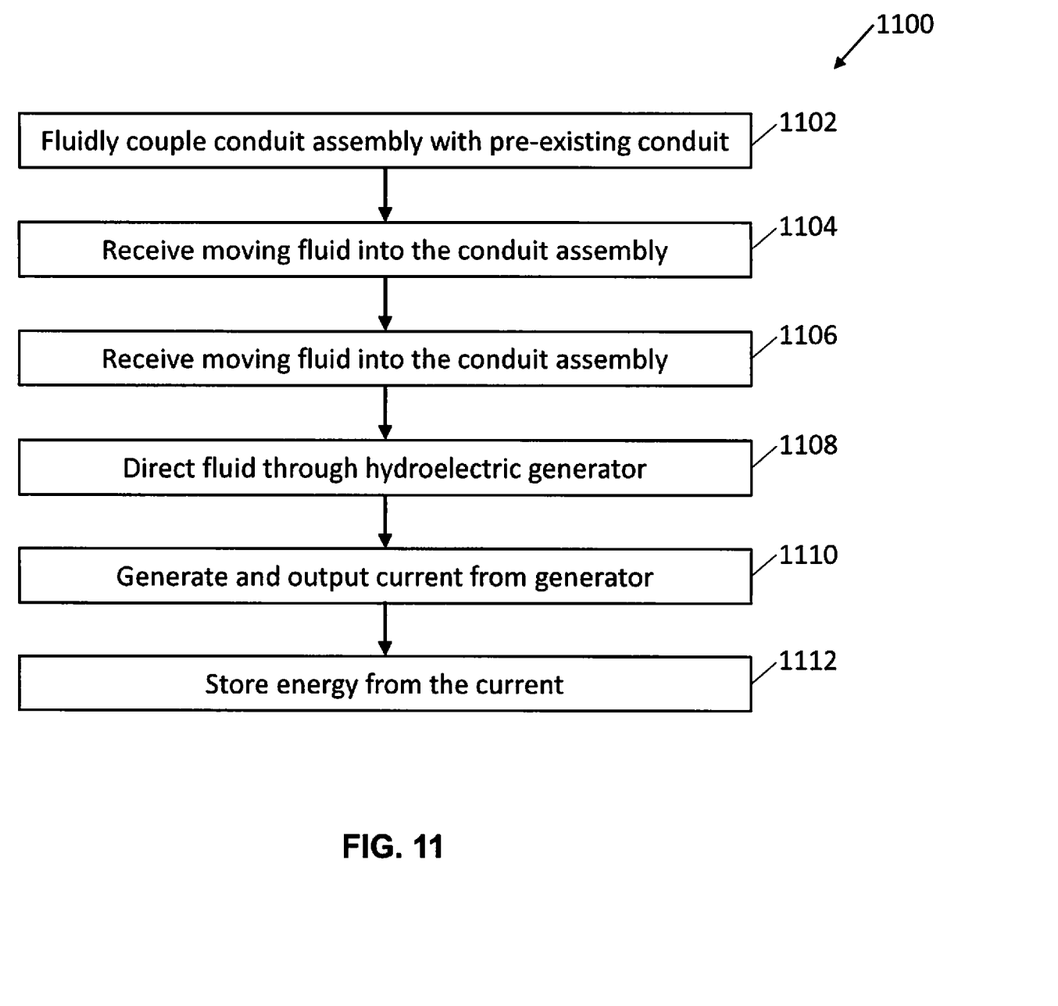
FIG. 11 illustrates a flowchart of one embodiment of a method for charging one or more energy storage devices.

FIG. 11 illustrates a flowchart of one embodiment of a method 1100 for charging one or more energy storage devices. The method 1100 can represent operations performed by one or more of the charging assemblies 100, 800, 900, 1000 described herein. At 1102, a conduit assembly of a charging assembly is fluidly coupled with a pre-existing conduit. For example, the conduit assembly of the charging assembly may be temporarily or permanently coupled with the conduit such as a downspout, a drain line, the water supply line, or the like. At 1104, liquid flowing through the pre-existing conduit flows into the conduit assembly of the charging assembly. For example, rainwater draining through downspout, water draining from the sink, water being supplied to a faucet or shower, etc., can flow through the downspout, water line, drain line, etc., and into the conduit assembly of the charging assembly.

At 1106, the liquid flowing through the pre-existing conduit and the conduit assembly can flow through one or more hydroelectric generators of the charging assembly. For example, water flowing down the downspout, water draining from a sink, or water being supplied to a faucet or shower head can flow through the conduit assembly of the charging assembly and through a hydroelectric generator of the charging assembly.

At 1108, current is generated and output by the hydroelectric generator. The liquid flowing through the hydroelectric generator or generators can turn a rotor of the hydroelectric generator within a stator. The movement of the rotor within the stator of the hydroelectric generator can create electric current. This electric current may be conducted by one or more wires, cables, buses, or the like to a voltage regulator device or other electronic component, prior to being conducted into one or more energy storage devices, such as one or more rechargeable batteries.

At 1110, the current is output by the hydroelectric generators is conducted to the energy storage device to charge the energy storage device. Alternatively, this current may be conducted directly to one of electronic components to power the components. In the situation where a battery is charged, this battery can then be used stored electric energy for later use, such as powering one or more phones, tablet computers, televisions, or the like. In a situation where the current output by the hydroelectric generator is used to power device, this current may be directed to one or more current modifying devices, such as an inverter, to change the current prior to powering the devices.

In one embodiment, a charging assembly includes a conduit assembly configured to be fluidly coupled with a pre-existing conduit through which a liquid flows, and a hydroelectric generator coupled with the conduit assembly such that at least part of the liquid flowing through the pre-existing conduit flows through the hydroelectric generator. The hydroelectric generator is configured to create an electric current based on flow of the liquid through the hydroelectric generator. The assembly also includes an energy storage assembly conductively coupled with the hydroelectric generator. The energy storage assembly is configured to store electric energy of the electric current created by the hydroelectric generator.

Optionally, the conduit assembly, the hydroelectric generator, and the energy storage assembly are hand-held components.

Optionally, the conduit assembly is configured to be removably coupled with the pre-existing conduit such that the conduit assembly is fluidly coupled with the pre-existing conduit while the liquid flows through the conduit assembly and the pre-existing conduit but the conduit assembly is separated from the pre-existing conduit while the liquid flows through the pre-existing conduit but the liquid is not flowing through the conduit assembly.

Optionally, the conduit assembly is configured to be coupled with an outer end of the pre-existing conduit.

Optionally, the conduit assembly is configured to be fluidly coupled with the pre-existing conduit in a location that is between opposite ends of the pre-existing conduit.

Optionally, the conduit assembly is configured to be coupled with a gutter downspout as the pre-existing conduit.

Optionally, the conduit assembly is configured to be coupled with a gutter as the pre-existing conduit.

Optionally, the conduit assembly is configured to be coupled with plumbing in one or more of a residential or commercial building as the pre-existing conduit.

Optionally, the conduit assembly is configured to be coupled with a drain line as the pre-existing conduit.

Optionally, the conduit assembly is configured to be coupled with a water supply line as the pre-existing conduit.

Optionally, the assembly also includes a filter configured to be disposed upstream of the hydroelectric generator along a direction of flow of the liquid.

Optionally, the conduit assembly and the hydroelectric generator are configured to be disposed inside the pre-existing conduit.

Optionally, the conduit assembly includes a funnel disposed upstream of the hydroelectric generator. The funnel can be shaped to channel the liquid toward and into the hydroelectric generator.

Optionally, the conduit assembly is configured to be coupled with the pre-existing conduit as a bypass line to the pre-existing conduit such that the liquid flowing in the pre-existing conduit is divided into first and second portions. The first portion of the liquid can flow through the pre-existing conduit and not flow through the hydroelectric generator. The second portion of the liquid can flow through both the conduit assembly and the hydroelectric generator.

Optionally, the energy storage assembly is one or more batteries.

In one embodiment, a charging assembly includes a hand-held conduit assembly configured to direct flow of a fluid, and a hand-held hydroelectric generator coupled with the conduit assembly such that at least part of the liquid flowing through the conduit assembly flows through the hydroelectric generator. The hydroelectric generator is configured to create an electric current based on flow of the liquid through the hydroelectric generator. The assembly also includes a hand-held energy storage assembly conductively coupled with the hydroelectric generator. The energy storage assembly is configured to store electric energy of the electric current created by the hydroelectric generator.

Optionally, the conduit assembly is configured to be fluidly coupled with a pre-existing conduit through which the liquid flows.

Optionally, the conduit assembly is configured to be removably coupled with the pre-existing conduit such that the conduit assembly is fluidly coupled with the pre-existing conduit while the liquid flows through the conduit assembly and the pre-existing conduit but the conduit assembly is separated from the pre-existing conduit while the liquid flows through the pre-existing conduit but the liquid is not flowing through the conduit assembly.

Optionally, the conduit assembly is configured to be coupled with an outer end of the pre-existing conduit.

Optionally, the conduit assembly is configured to be fluidly coupled with the pre-existing conduit in a location that is between opposite ends of the pre-existing conduit.

Optionally, the conduit assembly is configured to be coupled with a gutter downspout.

Optionally, the conduit assembly is configured to be coupled with a gutter.

Optionally, the conduit assembly is configured to be coupled with plumbing in one or more of a residential or commercial building.

Optionally, the conduit assembly is configured to be coupled with a drain line.

Optionally, the conduit assembly is configured to be coupled with a water supply line.

Optionally, the assembly also includes a filter configured to be disposed upstream of the hydroelectric generator along a direction of flow of the liquid.

Optionally, the conduit assembly and the hydroelectric generator are configured to be disposed inside a pre-existing conduit.

Optionally, the conduit assembly includes a funnel disposed upstream of the hydroelectric generator. The funnel can be shaped to channel the liquid toward and into the hydroelectric generator.

Optionally, the conduit assembly is configured to be coupled with a pre-existing conduit as a bypass line to the pre-existing conduit such that the liquid flowing in the pre-existing conduit is divided into first and second portions. The first portion of the liquid can flow through the pre-existing conduit and not flow through the hydroelectric generator. The second portion of the liquid can flow through both the conduit assembly and the hydroelectric generator.

Optionally, the energy storage assembly is one or more batteries.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A portable hydroelectric generator and battery charging system couplable to a downspout of a hose gutter system, comprising:

a hand-heldable quadrilateral conduit assembly comprising four walls, a floor section comprising at least four tapered surfaces, at least one circular opening, and at least one pipe;

at least one hand-heldable hydroelectric generator disposed within the at least one pipe; and     at least one hand-heldable energy storage assembly disposed outside the at least one pipe and conductively coupled to the at least one hydroelectric generator;

wherein:

said at least four tapered surfaces define a funnel between the four walls and the at least one circular opening, said at least one funnel configured to convey a liquid flow;

said at least one hydroelectric generator configured to create electrical energy from the liquid flow conveyed by the funnel;

said pipe is connected to the at least one circular opening; and         the portable hydroelectric generator and battery charging system is configured to be connected to a pre-existing conduit.

2. The portable hydroelectric generator and battery charging system of claim 1, wherein the at least one hand-heldable energy storage assembly comprises at least one battery.

3. The portable hydroelectric generator and battery charging system of claim 2, wherein the at least one hand-heldable energy storage assembly comprises a voltage regulator.

4. The portable hydroelectric generator and battery charging system of claim 3, wherein said at least one hand-heldable energy storage assembly is resistant to weather conditions.

5. The portable hydroelectric generator and battery charging system of claim 4, wherein said at least one hand-heldable energy storage assembly comprises a karabiner.

6. The portable hydroelectric generator and battery charging system of claim 1, wherein the at least one hand-heldable energy storage assembly comprises a voltage regulator.

7. The portable hydroelectric generator and battery charging system of claim 6, wherein the at least one hand-heldable energy storage assembly comprises at least one battery.

8. The portable hydroelectric generator and battery charging system of claim 7, wherein said at least one hand-heldable energy storage assembly is resistant to weather conditions.

9. The portable hydroelectric generator and battery charging system of claim 8, wherein said at least one hand-heldable energy storage assembly comprises a karabiner.

10. The portable hydroelectric generator and battery charging system of claim 1, wherein:
the floor section comprises at least twelve tapered surfaces, at least three circular opening, and at least three pipes; and
four of said at least twelve tapered surfaces define one of at least three funnels between the four walls and a corresponding circular opening of the at least three circular openings, each funnel configured to convey a liquid flow.

11. The portable hydroelectric generator and battery charging system of claim 10, further comprising at least three hand-heldable hydroelectric generators, each disposed within a corresponding one of the at least three pipes.

12. The portable hydroelectric generator and battery charging system of claim 11, wherein each one of the at least three hand-heldable hydroelectric generators is conductively coupled to the at least one hand-heldable energy storage assembly.

13. The portable hydroelectric generator and battery charging system of claim 12, wherein the at least one hand-heldable energy storage assembly comprises at least one battery.

14. The portable hydroelectric generator and battery charging system of claim 13, wherein the at least one hand-heldable energy storage assembly comprises a voltage regulator.

15. The portable hydroelectric generator and battery charging system of claim 14, wherein said at least one hand-heldable energy storage assembly is resistant to weather conditions.

16. The portable hydroelectric generator and battery charging system of claim 15, wherein said at least one hand-heldable energy storage assembly comprises a karabiner.

17. The portable hydroelectric generator and battery charging system of claim 12, wherein the at least one hand-heldable energy storage assembly comprises a voltage regulator.

18. The portable hydroelectric generator and battery charging system of claim 17, wherein the at least one hand-heldable energy storage assembly comprises at least one battery.

19. The portable hydroelectric generator and battery charging system of claim 18, wherein said at least one hand-heldable energy storage assembly is resistant to weather conditions.

20. The portable hydroelectric generator and battery charging system of claim 19, wherein said at least one hand-heldable energy storage assembly comprises a karabiner.

* * * * *